United States Patent [19]

Lisowyj et al.

[11] Patent Number: 4,678,647

[45] Date of Patent: Jul. 7, 1987

[54] PROCESS FOR THE RECOVERY OF GALLIUM AND GERMANIUM FROM COAL FLY ASH

[75] Inventors: Bohdan Lisowyj, Omaha, Nebr.; David C. Hitchcock, Independence, Mo.; Henry Epstein, Omaha, Nebr.

[73] Assignee: Enron Corp., Omaha, Nebr.

[21] Appl. No.: 861,985

[22] Filed: May 12, 1986

[51] Int. Cl.$^4$ .................. C01G 15/00; C01G 17/00
[52] U.S. Cl. ..................... 423/96; 423/133; 423/88; 423/542
[58] Field of Search ............... 75/89, 90 R, 91, 121; 423/89, 96, 111, 133, 542

[56] References Cited

U.S. PATENT DOCUMENTS

| | | | |
|---|---|---|---|
| 4,071,422 | 1/1978 | Charlton et al. | 75/121 |
| 4,252,777 | 2/1981 | McDowell et al. | 423/111 |
| 4,375,453 | 3/1983 | Nalewajek et al. | 423/111 |
| 4,475,993 | 10/1984 | Blander et al. | 204/645 |

FOREIGN PATENT DOCUMENTS 0120639 7/1982 Japan .................. 423/89

OTHER PUBLICATIONS

Report of Investigation 6940 of the United States Department of the Interior, Bureau of Mines, "Extraction of Germanium and Gallium from Coal Fly Ash and Phosphorous Furnace Flue Dust", by R. F. Waters and H. Kenworthy (1967).

Primary Examiner—John Doll
Assistant Examiner—Robert L. Stoll
Attorney, Agent, or Firm—Zarley, McKee, Thomte, Voorhees & Sease

[57] ABSTRACT

A method is disclosed for recovering gallium and/or germanium from fly ash which comprises pelletizing the fly ash, treating the pellets in the presence of an oxidizing gas at a temperature of from about 900° C. to just below the fusion temperature of the pellets, treating the pellets in the presence of a reducing gas at the same temperature range, and recovering gallium and/or germanium suboxides from the gas.

11 Claims, No Drawings

PROCESS FOR THE RECOVERY OF GALLIUM AND GERMANIUM FROM COAL FLY ASH

BACKGROUND OF THE INVENTION

The present invention relates to a method for the recovery of gallium and/or germanium from fly ash. In utility and industrial boilers burning coal, fly ash is produced. Electrostatic precipitators, wet scrubbers, baghouses or other recovery equipment are used to remove the fly ash particulates from the combustion gases. In general, the fly ash is composed of fine grained particles having a silica-alumina base with small amounts of some trace metals concentrated on the surfaces of the particles. Some of these trace metals are valuable, including molybdenum, tungsten, nickel, gallium, and germanium. Others, such as arsenic, lead and antimony, are toxic.

Numerous attempts have been made in the past to recover certain of the trace metals present in fly ash. *Report of Investigations* 6940 of the United States Department of the Interior, Bureau of Mines, entitled "Extraction of Germanium and Gallium from Coal Fly Ash and Phosphorous Furnace Flue Dust" by R. F. Waters and H. Kenworthy (1967) describes the efforts of the Bureau of Mines to recover germanium and gallium. Sublimation of these trace metals was the method described in the report. Furthermore, U.S. Pat. No. 4,475,993, issued Oct. 9, 1984, describes a process for recovering silver, gallium and other trace metals from a fine grained industrial fly ash. The process involves contacting the fly ash with aluminum trichloride in an alkali halide melt to react the trace metals with the aluminum trichloride to form compositions soluble in the melt and a residue which contains the silicate and aluminum oxide. Then, the desired trace metals are separated from the melt by electrolysis or other separation techniques.

It is an object of this invention to provide a method for the recovery of gallium and/or germanium from fly ash which is better than and more economical than the methods described above. The use of the oxidizing atmosphere step is an improvement over the Bureau of Mines' method in that arsenic and sulphur are removed from the fly ash so that they will not remain in the concentrated gallium and germanium fraction which is recovered.

SUMMARY OF THE INVENTION

This invention is a method for removing gallium and/or germanium from fly ash. The method comprises first pelletizing the fly ash and then treating the pellets in the presence of an oxidizing gas at a temperature of from about 900° C. to a temperature close to the fusion temperature of the pellets. This treatment removes unwanted elements, which are volatile in oxidizing atmospheres, typically arsenic and sulphur. Next, the oxides are treated in the presence of a reducing gas at a temperature from about 900° C. to just below the fusion temperature of the pellets to reduce the oxides to suboxides, which are volatile and consequently will sublime. Finally, the gallium and/or germanium suboxides are removed by condensation at a lower temperature (approximately 700°-800° C.).

DETAILED DESCRIPTION OF THE INVENTION

The process disclosed can be used to extract either gallium or germanium, or both, depending on which is present in the ash being treated. For convenience, both gallium and germanium will be assumed to be present and to be extracted, unless otherwise stated. The exact nature of the gallium and germanium containing phases are not known, but in the ash germanium probably has a valence of +4, and gallium is probably +3, so for convenience the gallium-containing material will be referred to as gallium oxide, $Ga_2O_3$, and the germanium-containing material will be referred to as germanium oxide, $GeO_2$.

Generally, it is best to start with a fly ash which is relatively high in gallium and/or germanium. There are fly ashes produced which are known to contain higher amounts of these materials. Fly ash is produced in large quantities by the combustion of coal, principally for the generation of electricity. This ash is generally an impure silicate, containing varying amounts of alumina, iron oxides, alkaline earth and alkali oxides, and smaller amounts of many elements, including in some cases gallium and germanium in the range of tens to thousands of parts per million. These two rare elements have been found to be more abundant in the ashes of certain eastern U.S. coals than in other coals from the United States. The gallium and germanium concentrations in the fly ash depend on the combustion conditions and the fly ash collection system, in addition to the composition of the coal. Fly ash from a cyclone burner has been found to have a high concentration of gallium and germanium, and in the case of a power plant with several ash collection systems, the gallium concentration of ashes from different collection devices varied.

It is highly preferred that the use of the process of the present invention be preceded by a step wherein the fly ash is first treated in order to remove as much of the non-gallium and non-germanium material as is possible. One such method is disclosed in commonly assigned co-pending application Ser. No. 813,968 entitled "Beneficiation of Gallium in Fly Ash", filed Dec. 27, 1985. This process produces a fly ash fraction which has a much higher concentration of gallium and germanium than the original fly ash.

The fly ash is pelletized so that the oxidizing and reducing gases can more easily contact the fly ash and to avoid fly ash entrainment. Standard methods of making the pellets can be used, e.g. balling drums or discs, but it is important that strong pellets be produced because they will be stacked on top of each other in a reaction vessel. They must be strong enough to support their own weight and also abrasion resistant so there will be many channels for gas flow therethrough.

The pellets are heated in a furnace. It is preferred that a direct fired furnace be used because it will save fuel. The heat treatment takes place in an oxidizing atmosphere which causes the removal of arsenic and sulphur from the fly ash. In a direct fired furnace, the oxidizing gases are obtained from the combustion products of the fuel (carbon dioxide, oxygen and water vapor). Generally, it is preferred that the temperature be at least 900° C. in order to efficiently remove arsenic and other trace elements that are volatile in oxidizing atmospheres. The temperature should not be more than just below the fusion temperature of the ash. This is the point at which the pellets fuse and stick together. This is undesirable because it would greatly reduce the surface area for contact with the gas. Generally, 1100° C. should not be exceeded but there may be some fly ashes for which higher temperatures could be used. It is preferred that the temperature not exceed 50° below the fusion temperature to avoid any possible problems.

The oxidizing step removes volatile elements such as arsenic and sulphur. Next, the pellets and the gallium and germanium oxides are subjected to a reducing atmosphere at a temperature within the same range and under the same constraints as discussed above for the same reasons. The reducing gas may be hydrogen, carbon monoxide, syngas (mixtures of methane and carbon dioxide), methane, volatile hydrocarbons or mixtures thereof with inert carriers such as nitrogen. The reducing gas may be made by steam reforming of natural gas or by partial oxidation of heavy hydrocarbons. The reducing atmosphere will reduce the oxides to suboxides which are much more volatile. The suboxides then sublime and are removed from the pellets in the gas. Table 1 below shows how one type of ash was treated at varying temperatures and how the percent of gallium removed therefrom generally increased until the temperature was increased to 1200° C. A gas composition of 95% nitrogen/5% hydrogen was used as the reducing agent.

TABLE 1

| Starting Material = 240 parts per million gallium | | | |
|---|---|---|---|
| Temperature (°C.) | Time (Hrs.) | Parts Per Million Gallium | Percent Gallium Removed |
| 900 | 1 | 100 | 58.3 |
|  | 3 | 69 | 71.2 |
| 1000 | 1 | 74 | 69.2 |
|  | 3 | 47 | 80.4 |
| 1100 | ½ | 90 | 62.8 |
|  | 1 | 63 | 73.7 |
| 1200 | ½ | 120 | 50.0 |

The final step of the method is to remove the suboxides from the gas. This can be done by condensing the suboxides on a cool surface such as a cold finger or some other such device. Another method for removing the suboxides from the gas would be to scrub the gas with a cold liquid solution which would dissolve them, such as a dilute acid.

EXAMPLES

Fly ashes from two eastern coal-burning power plants, Stuart and Kammer, were particle size classified by the Georgia Marble Company using a model G-24 Air Sifter. The classifier was adjusted to produce a fine fraction containing about 10% of the initial feed. The gallium concentrations in the feed ash and the fine fractions are given in Table 2.

TABLE 2

| Effect of Particle Size Classification by Georgia Marble Company on Gallium Concentration in Fly Ash | | |
|---|---|---|
| Kammer | Feed | 108 ppm Gallium |
|  | Fines, 10 wt. % of feed | 233 |
| Stuart | Feed | 71 ppm Gallium |
|  | Fines | 157 |

Pellets were produced from fly ash fine fractions. Two and one-quarter kilograms of Stuart fine fraction, 0.045 kg. of molasses, and 0.32 kg. of water were mixed, then pelletized in a rotating drum. The pellets were sieved, and those that were too large or small were remixed and returned to the drum. The acceptable pellets were dried in an oven.

Pellets were produced from the Kammer fine fraction with 70 weight percent ash, 18 weight percent kaolin binder, and 12 weight percent water, by the same procedure as that used for Stuart, but some of these pellets, before drying, were rolled in Stuart fines, so that a coating of Stuart fines was produced. The Kammer fines fused at a lower temperature than the Stuart, so the coating helped to prevent fusion of the furnace charge during high temperature treatment.

EXAMPLE I

Stuart pellets weighing 665 grams, from 2-3.4 mm diameter, were heated in an atmosphere of 30 vol. % $CO_2$, 70 vol. % $N_2$, to simulate combustion gases from direct fuel firing. They were held at 1000° C. for 30 minutes, then the atmosphere was changed to $H_2$, with a flow rate of 5 liters/minute, measured at room temperature, and the temperature was raised to 1100° C. and held for three hours. The gallium and germanium suboxides were collected on an air-cooled, Quartz condensor. After the run, condensed material was dissolved in nitric acid, evaporated, and found to weigh 0.85 gram. The analysis in Table 3 shows that this material was 10% gallium, so with a gallium concentration of 157 ppm gallium in the pellets, about 80% of the gallium was recovered.

TABLE 3

| Optimized Case of Stuart Sublimate Collected on Air Cooled Surface | |
|---|---|
| Element | Wt. % |
| Al | 0.78 |
| Si | 0.54 |
| S | 4.68 |
| Ca | 0.08 |
| Fe | 0.13 |
| Ni | 0.21 |
| Zn | 22.96 |
| Ga | 10.02 |
| Se | 0.75 |
| Sn | 2.27 |
| Pb | 36.17 |
| O | 21.40 |

EXAMPLE II

Coated pellets of Kammer were treated in the same manner as in Example I, except the maximum temperature was 1000° C. rather than 1100°, because of the lower fusion temperature of the Kammer ash. The pellets contained 100 grams of Stuart ash, (coating material), 101 grams of Kaolin, and 405 grams of Kammer ash. The amount of condensate collected was 0.41 grams, with the composition given in Table 4. The material had a composition of 3.6 weight percent gallium and 4.6 weight percent germanium, so that 14% of the available gallium and 6% of the available germanium was recovered.

TABLE 4

| Optimized Case of Kammer Sublimate Collected on Air Cooled Surface | |
|---|---|
| Element | Wt. % |
| Al | 1.24 |
| Si | 1.08 |
| S | 4.87 |
| Ca | 0.09 |
| Fe | 0.16 |
| Ni | 0.33 |

TABLE 4-continued

| Optimized Case of Kammer Sublimate Collected on Air Cooled Surface | |
|---|---|
| Element | Wt. % |
| Zn | 6.30 |
| Ga | 3.56 |
| Ge | 4.63 |
| Cd | 1.59 |
| Sn | 1.50 |
| Pb | 55.15 |
| O | 19.51 |

We claim:

1. A method of recovering gallium and germanium from fly ash which comprises:
   (a) pelletizing the fly ash, then
   (b) heating the pellets in an oxidizing atmosphere at a temperature of from about 900° C. to just below the fusion temperature of the pellets, the temperature being high enough to remove trace elements volatile in an oxidizing atmosphere, then
   (c) treating the pellets in a reducing atmosphere at a temperature of from about 900° C. to just below the fushion temperature of the pellets to reduce the gallium and germanium oxides to suboxides and cause them to sublime, and then
   recovering the gallium and germanium suboxides from the gas.

2. The method of claim 1 wherein the fly ash is treated prior to pelletizing so as to be concentrated in gallium and germanium content and decreased in iron content.

3. The method of claim 1 wherein the maximum temperature in steps (b) and (c) is 50° C. below the fusion temperature of the pellets.

4. The method of claim 1 wherein the suboxides are removed from the gas by condensing them on the cool surface of a condensor.

5. The method of claim 1 wherein the suboxides are recovered from the gas by scrubbing the gas with a liquid solvent which dissolves the suboxides.

6. The method of claim 1 in which the oxidizing atmosphere is created from the combustion products of a direct fired furnace.

7. The method of claim 6, wherein the combustion products of the direct fired furnace include carbon dioxide, oxygen and water vapor.

8. The method of claim 1, in which the reducing gases forming the reducing atmosphere are selected from the group consisting of hydrogen, carbon monoxide, mixtures of methane and carbon dioxide, methane, volatile hydrocarbons or mixtures thereof with inert carriers such as nitrogen.

9. The method of claim 1 wherein the trace elements include arsenic and sulphur.

10. The method of claim 2 wherein the germanium and gallium are concentrated in the fly ash by attrition scrubbing.

11. The method of claim 5 wherein the liquid solvent is a dilute acid.

* * * * *